United States Patent
Durbin et al.

(10) Patent No.: US 7,135,962 B2
(45) Date of Patent: Nov. 14, 2006

(54) SECURITY AND REMOTE ACCESS FOR VEHICULAR ENTERTAINMENT, SAFETY, AND CONVENIENCE SYSTEMS

(75) Inventors: John Durbin, San Diego, CA (US); Mark Edward Rutledge, Murietta, CA (US); Bounthavy Kenneth Manivone, San Diego, CA (US); John T. Welch, Phoenix, AZ (US); John F. Wilson, San Diego, CA (US); Neil John Sturtevant, San Marcos, CA (US); James S. Turner, Mesa, AZ (US)

(73) Assignee: Dei Headquarters, Inc., Vista, CA (US)

( * ) Notice: Subject to any disclaimer, the term of this patent is extended or adjusted under 35 U.S.C. 154(b) by 211 days.

(21) Appl. No.: 11/018,689

(22) Filed: Dec. 20, 2004

(65) Prior Publication Data
US 2005/0168071 A1 Aug. 4, 2005

Related U.S. Application Data

(60) Provisional application No. 60/533,942, filed on Jan. 2, 2004.

(51) Int. Cl.
*B60Q 1/00* (2006.01)
*G06F 7/00* (2006.01)

(52) U.S. Cl. .............................. 340/425.5; 340/426.14; 340/426.35; 340/7.39; 340/825.69; 340/825.72; 701/36; 701/49; 710/8; 710/15; 307/9.1

(58) Field of Classification Search .............. 340/425.5, 340/426.13, 426.14, 426.15, 425.16, 426.17
See application file for complete search history.

(56) References Cited

U.S. PATENT DOCUMENTS

| | | | | |
|---|---|---|---|---|
| 5,787,367 A | * | 7/1998 | Berra | 701/1 |
| 6,249,216 B1 | * | 6/2001 | Flick | 340/426.14 |
| 6,449,541 B1 | * | 9/2002 | Goldberg et al. | 701/36 |
| 6,505,100 B1 | * | 1/2003 | Stuempfle et al. | 701/1 |

* cited by examiner

*Primary Examiner*—Donnie L. Crosland
(74) *Attorney, Agent, or Firm*—Anatoly S. Weiser; KC Bean

(57) ABSTRACT

A security system in a vehicle extends its protection to installed equipment of the vehicle, such as audio components, navigation systems, and entertainment systems. The installed equipment is armed and disarmed by the security system, preventing the equipment from normal functioning after unauthorized removal. The security system further enables programming, monitoring, and diagnosing of the installed equipment through the security system's remote control, through a configuration and maintenance tool that connects to the security system, or through other items of installed equipment within the vehicle, such as a rear-seat entertainment system.

64 Claims, 7 Drawing Sheets

SECURITY AND REMOTE ACCESS FOR VEHICULAR ENTERTAINMENT, SAFETY, AND CONVENIENCE SYSTEMS

REFERENCE TO RELATED APPLICATION

This application claims priority of Provisional U.S. patent application Ser. No. 60/533,942, filed Jan. 2, 2004, which is incorporated herein by reference in its entirety.

FIELD OF THE INVENTION

The present invention relates generally to security systems, and, more particularly, to security systems installed in automobiles and other mobile environments.

BACKGROUND

A modern automobile is a technological marvel of substantial economic value. Often, it is protected by a security system designed to prevent theft and vandalism. The security system is just one of the optional equipment items present in a typical automobile or another vehicle. There are many others, for example, high-performance stereo sound reproduction systems, rear-seat entertainment systems, and navigation systems. These systems and similar entertainment, safety, and convenience items typically installed in cars and other vehicles ("installed equipment" or "installed components" hereinafter) can account for a considerable part of the total value of the vehicle. Left in the vehicle, the installed equipment is subject not only to the danger of being stolen together with the vehicle, but also to its own vagaries: for example, the installed equipment can be stolen from the vehicle, or the equipment can be abused while the vehicle is entrusted to a third party, such as a mechanic or a parking attendant.

Consider, for example, a high-power audio amplifier. Its cost can be in many hundreds or thousands of dollars, and much effort can be spent on its installation. Obviously, it presents a tempting target to a potential thief. Furthermore, the power produced by the amplifier can damage the loudspeakers of the vehicle under some circumstances. The vehicle's owner may not want to allow access to the amplifier and to the rest of the sound reproduction system when leaving the vehicle with a parking attendant or an auto mechanic. For these and other reasons, some amplifiers have a mode in which they are non-functional. When locked in this mode, the amplifier cannot be used in the vehicle where it was originally installed or in another environment, without a key used to unlock it. Unfortunately, inserting and removing a physical key, such as a key that includes an electronic memory with burned-in code, is inconvenient because the amplifier is likely to be located in a trunk or another location that is not conveniently accessible. A need thus exists for a convenient method and apparatus to lock and unlock installed equipment electronically.

Moreover, the installed equipment may need to be configured, periodically monitored, and diagnosed. The stereo amplifier discussed above, for example, can be a rather sophisticated piece of audio equipment with programmable configuration and diagnostic features. One example of such features is the availability of programmable gain adjustment and gain adjustment lockout mechanisms. Another example is the programmability of turn-on delay. Yet another example is the availability of self-diagnostic information stored within the amplifier. Typically, access to such configuration and diagnostic features requires specialized equipment used by dealers and installers of electronic equipment. It would be desirable to provide at least limited access to these features to the end-user, and to dealers and installers without the specialized equipment. A need thus exists for a method and apparatus that would allow convenient access to configuration and diagnostic features of the installed equipment.

SUMMARY

The present invention is directed to apparatus and methods that satisfy these needs. An embodiment of the invention herein disclosed provides a combination of a security system and an installed equipment item. The security system includes a base controller installed in a vehicle, a base transceiver installed in the vehicle and coupled to the base controller, and a remote control. The remote control includes a human input device, such as a keypad, a display device, for example, a screen, and a remote control transceiver communicating with the base transceiver. A person can use the remote control to send instructions and data, which are inputted through the human input device, to the base controller, via the base and remote control transceivers.

A bus couples the base controller to the installed equipment item. The installed equipment item performs some function in the vehicle, typically a function related to safety, convenience, entertainment, or security. Examples of the installed equipment items include audio components, such as amplifiers, positioning and location systems, and entertainment systems.

The installed equipment item includes an operational memory storing program code, a processor executing the code, and an interface port coupling the processor to the bus. The processor prevents the installed equipment item from performing the function, audio amplification, for example, in a normal manner after receiving an arm command from the base controller via the bus.

The security system sends the arm commands in predefined circumstances, for example, when the security system is armed to protect the vehicle. When the security system is disarmed, it sends a disarm command to the installed equipment item. When the processor receives the disarm command, it returns functionality of the item to normal state. If power is removed from the installed equipment item when it is in the armed state, the item will require resetting using a special tool or installer access code before it will function normally once again.

The remote control of the security system can be used to configure the parameters of the installed equipment item. The parameters, for example, turn-on delay, gain adjustment range, and audio performance parameters of an amplifier, are entered through the remote control and sent to the base controller of the security system. The base controller then sends the parameters to the processor of the installed equipment item. The processor receives the parameters and configures the installed equipment item in accordance with the received parameters.

The remote control can also be used to obtain maintenance and diagnostic data from the installed equipment item. An operator of the security system uses the remote control to enter an instruction to request the data, and sends the instruction to the base controller. The base controller then sends a command to the installed equipment item, requesting the data. The processor of the installed equipment item receives the command and sends the data to the base controller, which, in turn, sends the data back to the remote control. The remote control displays the data on its display device.

Note that a second installed equipment item can serve as a man-machine interface used by the operator to enter configuration parameters, to request and view the maintenance and diagnostic data, or to arm and disarm the installed equipment of the vehicle. For example, a rear-seat entertainment system can be connected to the security system and set up to send instructions to an audio amplifier, and to receive and display data from the amplifier.

These and other features and aspects of the present invention will be better understood with reference to the following description, drawings, and appended claims.

BRIEF DESCIRPTION OF THE FIGURES

Figure 6:
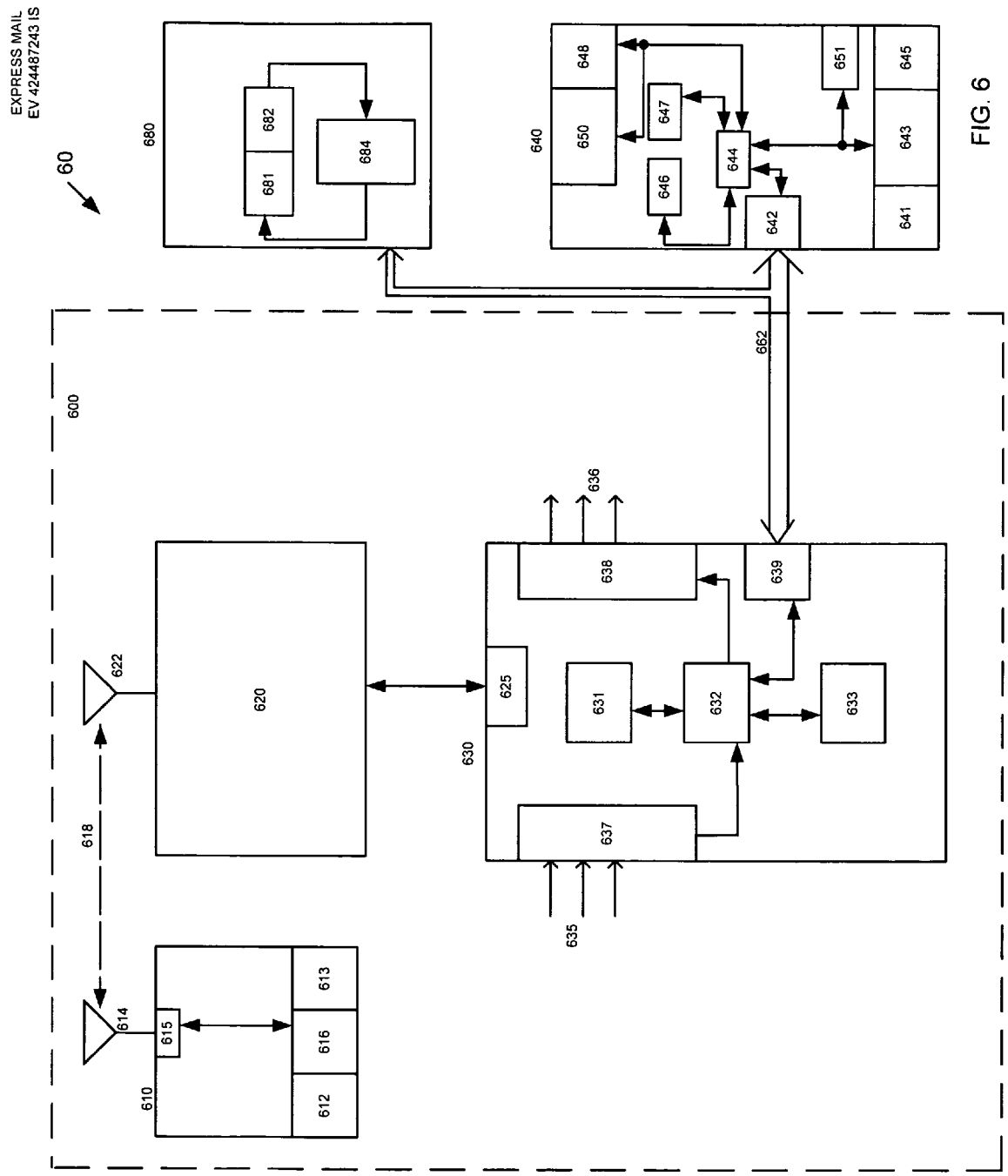
Figure 7:
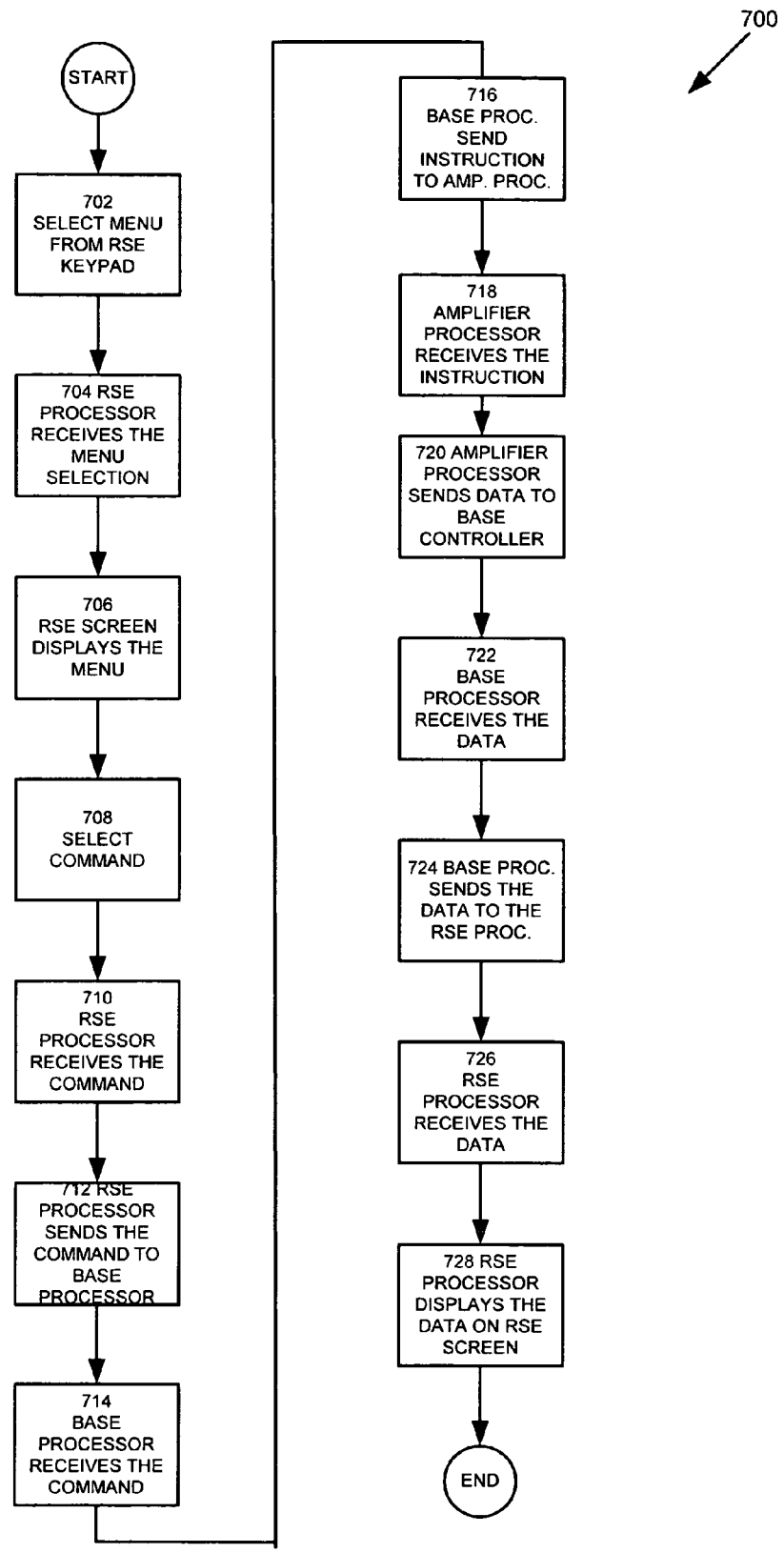

FIG. 6 is a high-level schematic diagram of a combination of a vehicular security system, a high-performance audio amplifier, and a rear-seat entertainment system, in accordance with the present invention; and FIG. 7 illustrates selected steps of a process of issuing a command from the rear-seat entertainment system to the high-performance audio amplifier of FIG. 6, in accordance with the present invention.

DETAILED DESCRIPTION

Reference will now be made in detail to several embodiments of the invention that are illustrated in the accompanying drawings. Wherever possible, same or similar reference numerals are used in the drawings and the description to refer to the same or like parts. The drawings are in a simplified form and are not to precise scale. For purposes of convenience and clarity only, directional terms, such as, top, bottom, left, right, up, down, over, above, below, beneath, rear, and front, may be used with respect to the accompanying drawings. These and similar directional terms should not be construed to limit the scope of the invention in any manner. Furthermore, in descriptions and in claims, "couple," "connect," and similar words with their inflectional morphemes do not necessarily import an immediate or direct connection, but include connections through mediate elements within their meanings.

Figure 1:
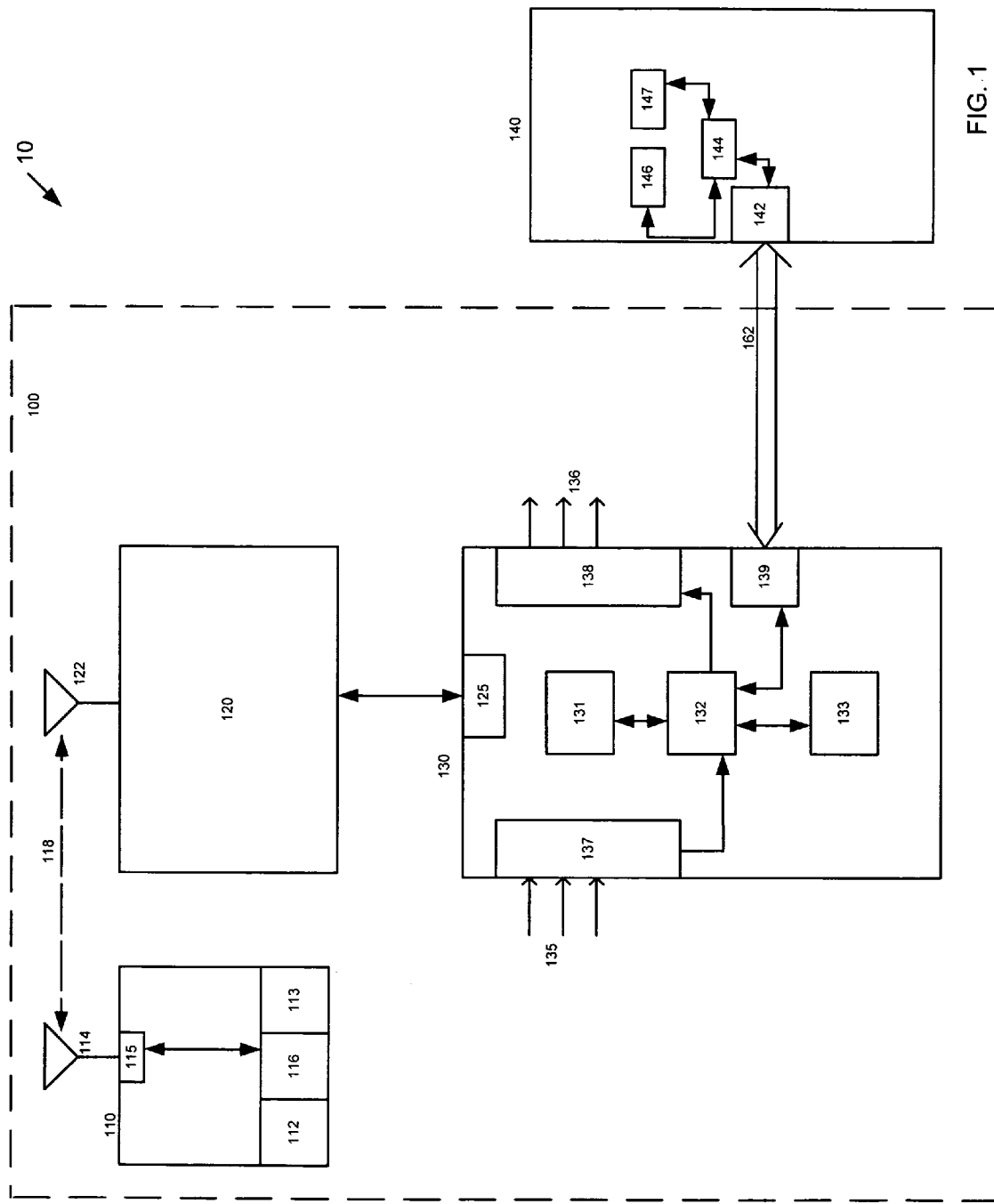
FIG. 1 is a high-level schematic diagram of a combination of a vehicular security system with an installed equipment item, in accordance with the present invention.

Referring more particularly to the drawings, FIG. 1 illustrates, in a high-level schematic diagram form, a combination 10 of a security system 100 with an installed equipment item 140. The security system 100 has three major components: a remote control 110, a base transceiver 120, and a base controller module 130. The base transceiver 120 and the base controller module 130 are installed in a car, while the remote control 110 is a portable device designed to allow a person to operate the security system 100 remotely.

In the embodiment illustrated in FIG. 1, the base controller 130 performs the logic and interface functions of the security system 100. The base controller 130 includes a base processor 132 coupled to a random access memory (RAM) 133 and to a read only memory (ROM) 131. The ROM 131 stores the program code executed by the processor 132 and the preprogrammed data used by the processor 132 in the course of executing the program code. The ROM 131 may include a programmable ROM (PROM) module, an electrically programmable ROM (EPROM) module, and an electrically erasable programmable ROM (EEPROM) module. In some variants of the combination 10, the memory 131 includes an EEPROM device that also stores data received from the installed equipment item 140. The data is thus preserved through interruptions in electrical power and can be retrieved in the future for diagnostic and maintenance purposes. The RAM 133 is a scratch pad memory for storing intermediate results and other temporary data generated by the processor 132 in the course of executing the program code.

The base controller 130 further includes a transceiver interface block 125, through which the base controller 130 communicates with the transceiver 120 and the remote control 110, and input/output (I/O) blocks 137 and 138. The I/O block 137 couples the base processor 132 to inputs 135, which are connected to various sensors and user controls of the security system 100, such as a valet switch, vibration sensor, movement sensor, door and trunk status (open/close) sensors, ignition sensor, and other sensors and controls. The I/O block 138 provides the base processor 132 with the capability to control various output devices connected to outputs 136, such as system status LEDs that indicate whether the system 100 is on or off, and whether an alarm event has occurred since activation of the system. Additionally, the processor 132 uses the I/O block 138 to activate the siren of the security system 100. In some variants of the combination 10, the I/O blocks 137 and 138 also provide connections to a battery voltage monitor, trunk release solenoid, wireless telephone link, vehicle locator system, relays operating power windows, power lock solenoids, and ignition and starter activation relays used to start the car remotely. Thus, the I/O blocks 137 and 138 enable the base controller 130 to receive the inputs that are needed for or affect the operation of the security system 100, and to operate various indicators and other output devices that are part of the security system 100.

Numeral 139 designates an interface block that couples the base controller 130 to the installed equipment item 140 via a bus 162. In the particular embodiment of FIG. 1, the bus 162 includes a serial data bus. Thus, the interface block 139 includes a serial interface port. More generally, variants of the combination 10 in accordance with the present invention can use various other connections between the item 140 and the security system 100, including parallel digital buses, analog connections, optical links, radio frequency (RF) links, infrared links, and other wired and wireless connections. In each case, the interface block 139 takes appropriate form in accordance with the actual connection used. For example, where the bus 162 is a parallel bus, the block 139 is a parallel port.

In the combination 10, the base controller 130 is implemented as a microcontroller, with the processor 132, memories 131 and 133, and I/O blocks 125, 137, 138, and 139 being fabricated on the same integrated circuit. In other embodiments, the base controller is implemented as a microprocessor with the memories and some of the I/O blocks being physically located on integrated circuits other than the integrated circuit containing the microprocessor. While microprocessors and microcontrollers represent general-purpose, software-driven digital state machines that can be used for performing many functions of the base controller 130, and of other processors and controllers described in this document, in some embodiments, these processors are implemented as application-specific digital state machines. These state machines can be primarily or exclusively hardware-based engines; the state machines can also combine both hardware and software functions.

Turning now to the remote control 110, it includes a controller 116 and a transceiver 115 that allows the controller 116 to communicate with the transceiver 120 over an RF communication link 118. The remote control 110 further includes an alphanumeric display 112, and pushbutton and scroll wheel input devices 113 (i.e., human input devices). Using these human interface devices 112 and 113, the operator of the security system 100 can send remote commands to the security system 100, and receive from the system 100 information, such as status, diagnostic, maintenance, and acknowledgement data. As will be seen below, the data received by the remote control 110 can include information originating in the installed equipment item 140.

The item 140 includes an installed equipment processor 144, memory modules 146 and 147, and an interface port 142. The port 142 is similar to the port 139 of the base controller 130, providing data flow between the base processor 132 and the installed equipment processor 144. The memory modules 146 include both RAM and ROM modules, while the memory module 147 is a non-volatile, electrically programmable memory module. In the embodiment illustrated in FIG. 1, the non-volatile memory module 147 is an EEPROM. The processor 144 executes program code stored in the memory 146, selectively activating and deactivating normal operation of the installed equipment item 140, depending on the value stored in an activation location within the EEPROM 147. As will be seen, the value in the activation location can be controlled, directly or indirectly, by the base controller 130.

Figure 2:
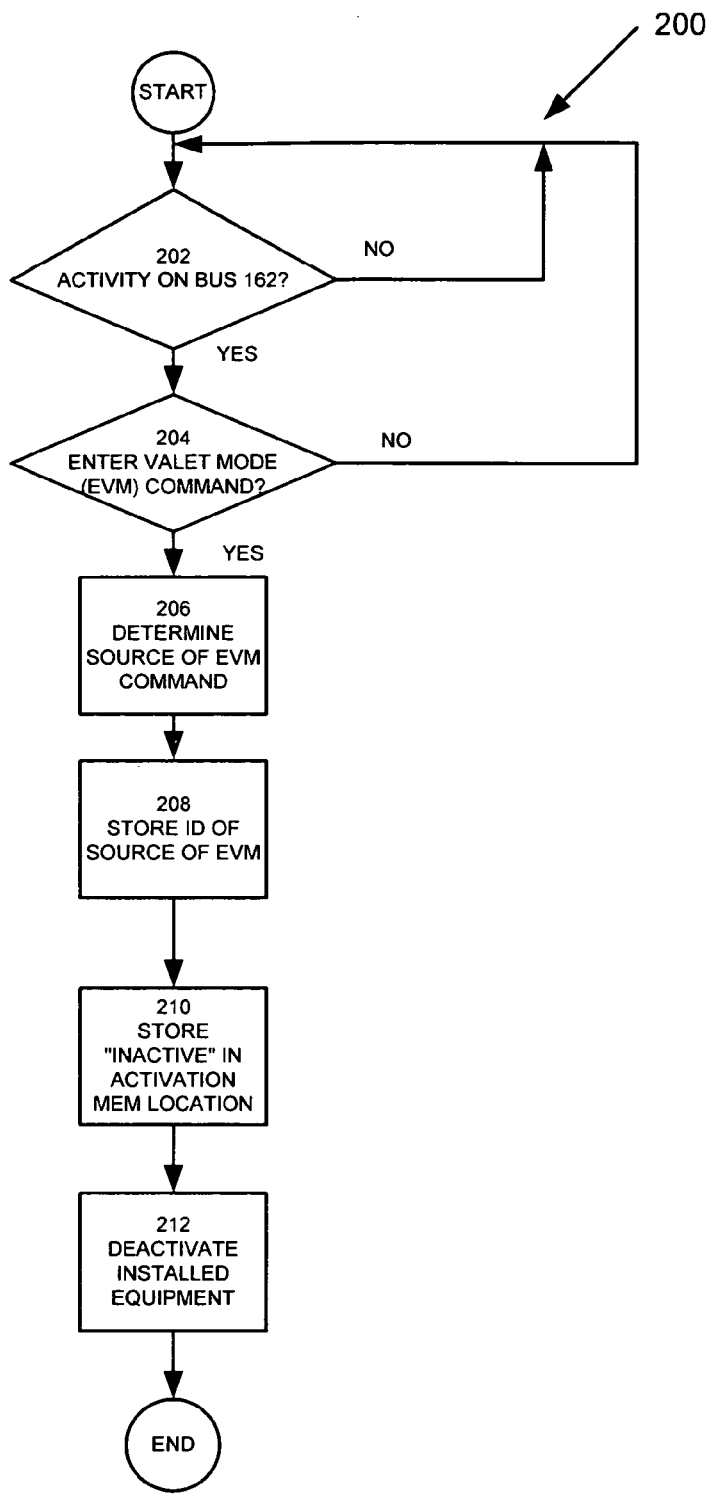
FIG. 2 illustrates selected steps of a process performed by the processor of the installed equipment item of FIG. 1 in deactivating the installed equipment item, in accordance with the present invention.

FIG. 2 illustrates selected steps of a process 200 performed by the processor 144 in deactivating the installed equipment item 140. Beginning with step 202, the processor 144 monitors the status of the serial bus 162 through the interface port 142. When the base controller 130 outputs information on the serial bus 162, the processor 144 knows the source of the information because the base controller outputs a unique identifier associated with the base controller 130 as part of the information. The base controller 130 can do this, for example, by outputting a particular sequence on extra output channels available in the security system 100, which is a multi-channel system. The installed equipment item 140 is programmed to recognize the particular sequence of channel numbers as the unique identifier used by the base controller 130.

The information output by the base controller 130 is generally of two types: data and commands. One of the commands from the controller 130 to the installed equipment item 140 is "Enter Valet Mode." At step 204, the processor 144 determines whether the information on the bus 162 is the "Enter Valet Mode" command. If the command is indeed "Enter Valet Mode," the processor proceeds to step 206; otherwise, it returns to step 202. At step 206, the processor 144 identifies the source of the "Enter Valet Mode" command by reading the unique identifier output by the base controller 130. At step 208, the processor 144 stores the identifier of the base controller 130 in a memory location of the EEPROM 147; we will designate this memory location as the "source of deactivation" location. At step 210, the processor 144 writes an "inactive" value into the activation location of the EEPROM 147. The processor 144 then deactivates the installed equipment item 140 at step 212, so that the item 140 either works not at all, or its functionality is reduced or otherwise modified.

Figure 3:
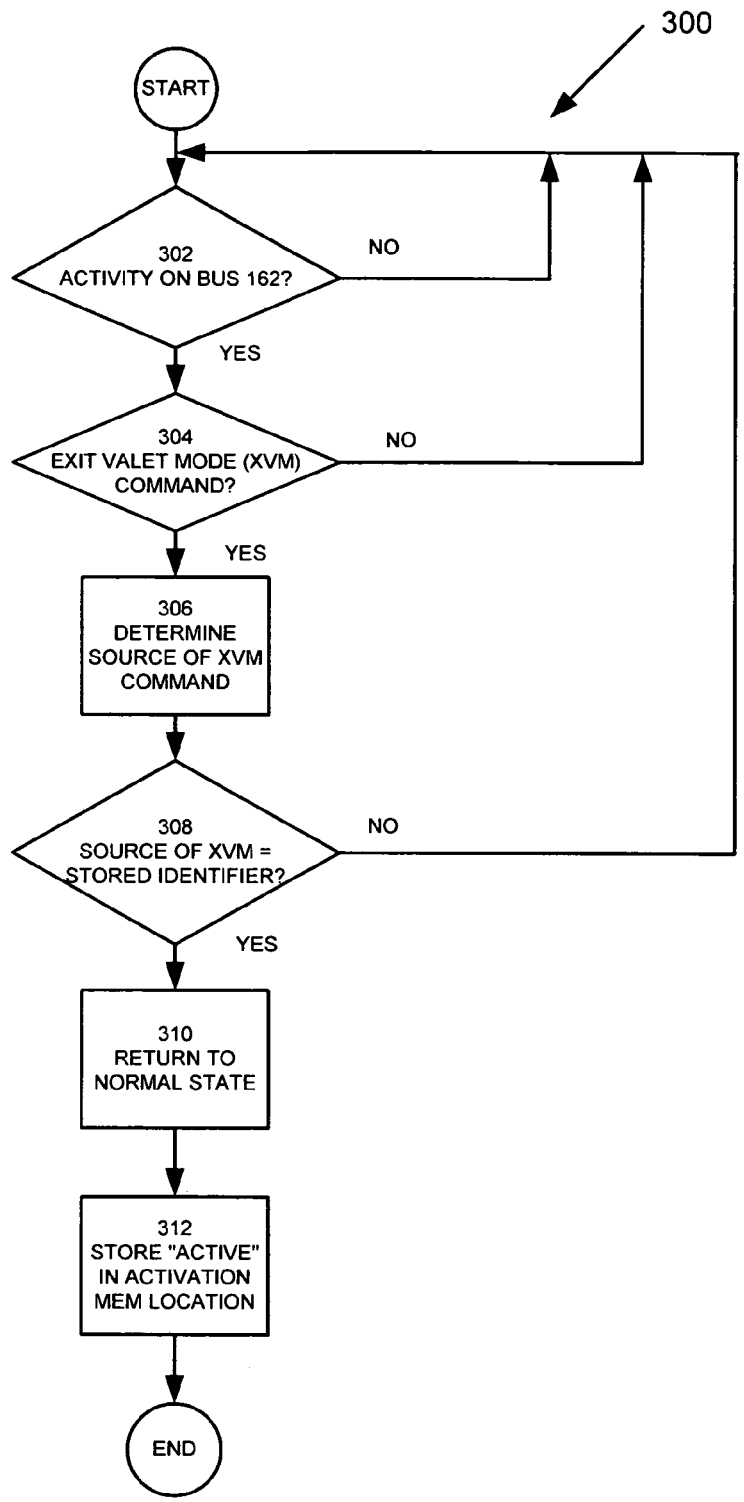
FIG. 3 illustrates selected steps of a process performed by the processor of the installed equipment item of FIG. 1 in activating the installed equipment item, in accordance with the present invention.

FIG. 3 illustrates selected steps of a process 300 performed by the processor 144 in activating the installed equipment item 140. The processor 144 monitors the status of the bus 162 through the interface port 142, at step 302. When activity is detected on the bus 162, the processor 144 reads the information on the bus 162 and determines whether the information includes an "Exit Valet Mode" command, at step 304. This command directs the processor 144 to cause the installed equipment item 140 to exit the Valet or inactive mode, if certain conditions are met. If the information on the bus 162 includes the "Exit Valet Mode" command, the processor proceeds to step 306; otherwise, it returns to step 302. At step 306, the processor determines the source of the "Exit Valet Mode" command from the unique identifier of the source included in the information on the bus 162. At step 308, the processor 144 compares the unique identifier received and the identifier stored in the source of deactivation location of the EEPROM 147. If the two identifiers do not match, process flow returns to step 302. If the two identifiers do match, the processor 144 returns the functionality of the installed equipment item 140 to normal state, at step 310. At step 312, the processor 144 writes an "active" value into the activation location of the EEPROM 147, or simply clears this location. Thus, the installed equipment item 140 needs to receive the Exit Valet Mode command from the base controller that locked it, in order to resume normal operation with full functionality.

Figure 4:
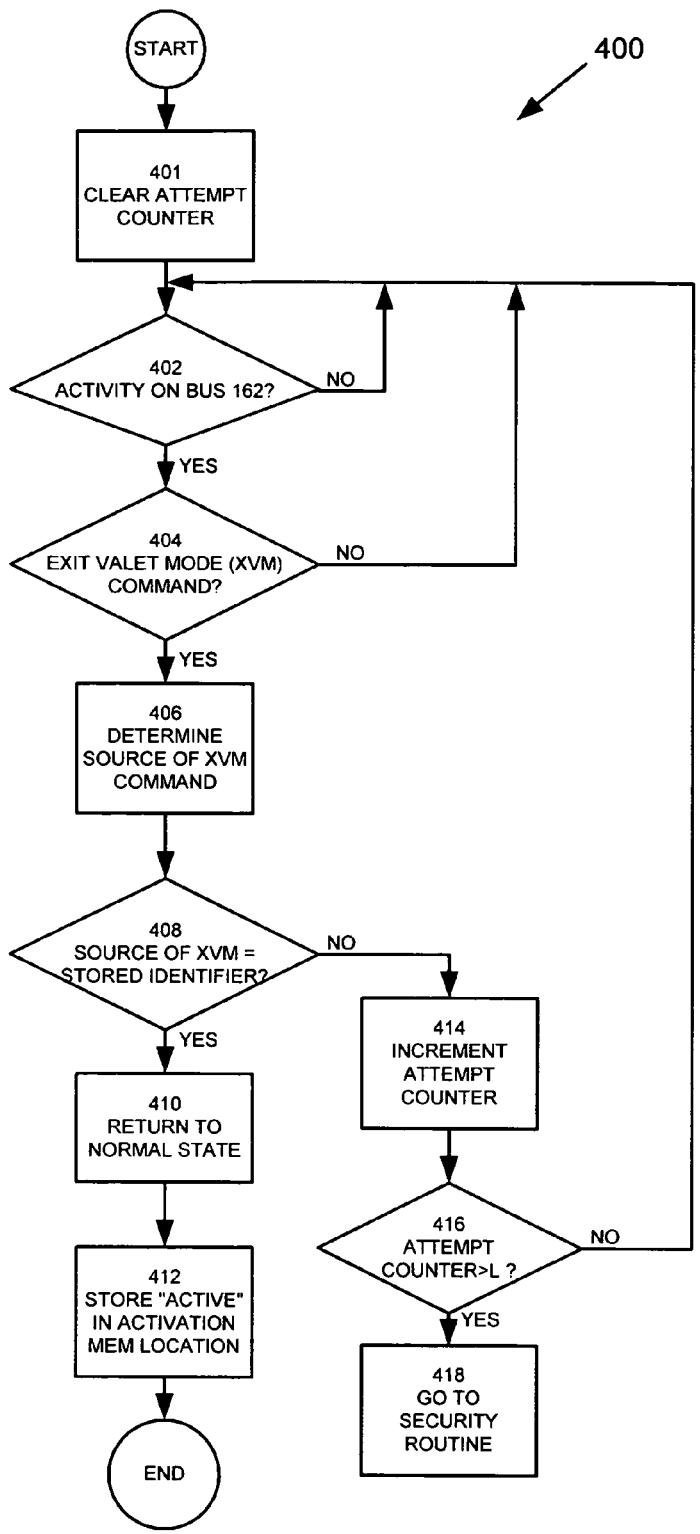
FIG. 4 illustrates selected steps of another process performed by the processor of the installed equipment item of FIG. 1 in activating the installed equipment item, in accordance with the present invention.

FIG. 4 illustrates selected steps of a process 400 performed by the processor 144 in activating the installed equipment item 140. The process 400 is similar to the process 300, but it limits the number of unsuccessful attempts to return the equipment item 140 to normal operation from the Valet Mode. By an "unsuccessful attempt" we mean receiving the Exit Valet Mode command from a source other than the base controller that initiated the Valet or inactive mode.

Beginning with step 401, the processor 144 clears the attempt counter. At step 402, the processor 144 monitors the status of the bus 162 through the interface port 142. When the processor 144 detects activity on the bus 162, it reads the information on the bus 162 and determines whether the information includes an "Exit Valet Mode" command, at step 404. If the information on the bus 162 includes the "Exit Valet Mode" command, the processor proceeds to step 406; otherwise, it returns to step 402. At step 406, the processor determines the source of the "Exit Valet Mode" command from the unique identifier of the source of the command. At step 408, the processor 144 compares the unique identifier received and the identifier stored in the source of deactivation location of the EEPROM 147. If the two identifiers match, the processor returns the functionality of the installed equipment item 140 to normal state, at step 410, and, at step 412, writes an "active" value into the activation location of the EEPROM 147, or simply clears this location.

If the two identifiers do not match, the processor 144 proceeds to step 414 and increments the attempt counter. At step 416, the processor 144 compares the attempt counter to a limit set on the number of unsuccessful attempts. If the limit has not been reached, the processor 144 returns to step 402. Otherwise, it proceeds to a security routine. In the process 400, this routine causes the processor to stop monitoring the bus 162 for a predetermined period of time, for example, one hour. This interval helps to defeat brute-force attempts to guess the unique identifier of the base controller that caused the installed equipment item 140 to enter the Valet Mode.

In some variants of the embodiment illustrated in FIG. 1, the value in the activation location is modified directly by the base controller 130, which performs direct memory access operations to the EEPROM 147 through the ports 139 and 142, and the bus 162.

Let us now turn to the conditions that cause the security system 100 to issue the Enter and Exit Valet Mode commands. In one embodiment, the system 100 sends the Enter Valet Mode command to the item 140 when the operator sends from the remote control 110 an instruction to arm the item 140, or to lock and arm the vehicle. The instruction may require the operator to input an access code. Similarly, the security system 100 sends an Exit Valet Mode command when it receives an unlock/disarm instruction from the operator. The unlock instruction may also require the operator to input an access code. The system 100 can be configured to issue the Enter Valet Mode command whenever the security functions of the security system 100 are activated, for example, when the doors of the car are locked for a predetermined time with the ignition in the off state, or when an alarm is triggered. The system 100 can also be configured to issue the Enter Valet Mode command on power-up, so that the installed equipment item 140 is in the Valet Mode until the operator of the system 100 causes the system 100 to issue an Exit Valet Mode command by entering an instruction to disarm the installed equipment item 140, accompanied by the operator's access code.

Figure 5:
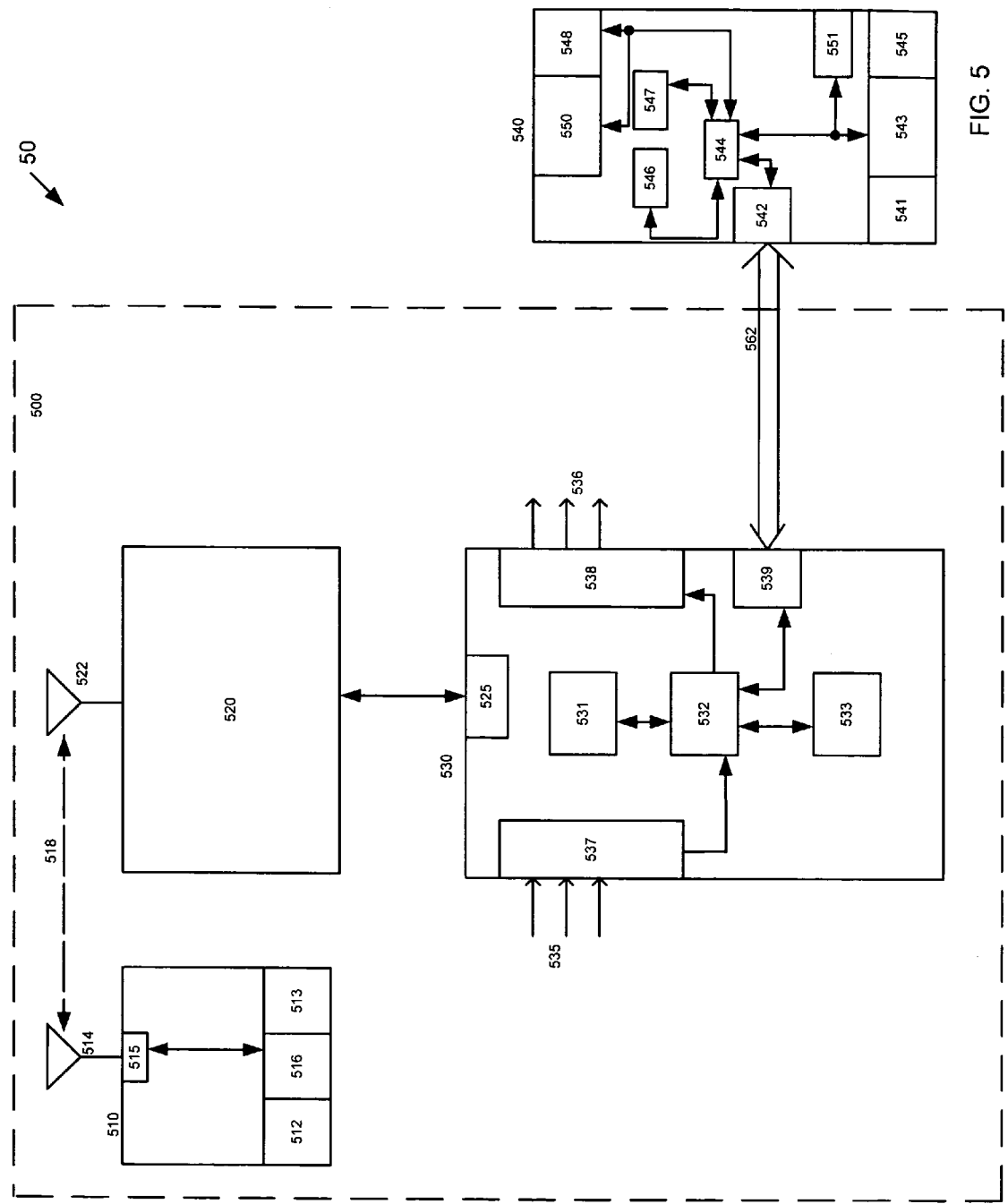
FIG. 5 is a high-level schematic diagram of a combination of a vehicular security system with a high-performance audio amplifier, in accordance with the present invention.

FIG. 5 illustrates, in a high-level schematic diagram form, a combination 50 of a security system 500 with a high-performance audio amplifier 540, in accordance with the present invention. As can be seen, the structure of the combination 50 is quite similar to the structure of the combination 10 of FIG. 1, with similar or identical components being designated by similar numbers having "5" as the first digit.

The amplifier 540 includes an interface port 542, an operational memory 546, EEPROM module 547, power supply 548, cooling fan 550, and display LEDs 551, connected to an amplifier processor 544. The function of the port 542 is to provide an interface between a bus 562 and the processor 544. The memory 546 serves to store the code executed by the processor 544, and the variables and other data used by the processor 544 in the course of executing the program code, while the EEPROM module 547 stores the configuration and security data for the amplifier 540, as well as certain diagnostic and maintenance data that is preserved in the absence of power. The amplifier 540 further includes an audio processing section 543, audio input connectors 541, and audio output connectors 545. The audio processing section 543 provides substantially all audio processing functions for the audio signals received at the connectors 541 and output at the connectors 545. These functions—such as signal conditioning, equalization, and gain—are controlled by the amplifier processor 544 based on values stored in the EEPROM 547. The audio processing section 543 includes a digital signal processor.

We now provide a high-level description of selected aspects of the overall functionality of the amplifier 540, including some of the functions of the audio processing section 543.

ESP Port. The amplifier 540 has an ESP port for connecting a special configuration and maintenance tool used for configuring the amplifier parameters, such as those described in the following paragraphs, and for reading maintenance and diagnostic data from the amplifier 540. An installer of the amplifier 540 uses the tool to write the parameters directly into the EEPROM 547. In other embodiments, the tool allows the installer to cause the amplifier processor 544 to write the parameters into the EEPROM 547.

Base Controller to Amplifier Communications. The base controller 530 of the security system 500 is capable of sending commands to and exchanging information with the amplifier 540, using the bus 562 and the ports 539 and 542. The commands include configuration commands, diagnostic/maintenance commands, and status queries; the information includes diagnostic, maintenance, configuration, and status data. The base controller 530 can send commands after receiving an appropriate instruction from the remote control 510, which may be accompanied by an access code (password or personal identification code). In some variants of the combination 50, the instruction comes through the configuration and maintenance tool, which is capable of connecting to the base controller 530.

Security Mode. The amplifier 540 can function in three different security modes: ESP, PIN, and OFF. In the ESP mode, the amplifier 540 can be armed, for example, by arming the security system 500, and the amplifier 540 will not function until it is disarmed. If main power is disconnected while the amplifier 540 is armed, the amplifier 540 will have to be reset using the configuration and maintenance tool, before it will become functional again. The amplifier 540 enters and exits the armed state in a way similar to the way item 140 of FIG. 1 enters and exits the Valet Mode.

The PIN mode is similar to the ESP mode, but the amplifier 540 requires a special personal identification access code to be transmitted to it via the bus 562 to disarm and become functional. In operation, the security system 500 receives the personal identification code from the remote control 510 via the link 518, together with the instruction that directs the security system 500 to disarm the amplifier 540. Alternatively, a special command sequence can be sent from the security system 500 to the amplifier 540, instead of the user-selectable PIN. The special command sequence can be an installer access code, i.e., a code not accessible to general public, but available to installers and dealers in security equipment. The base controller 530 receives the special security code from the remote control 510 or from the configuration and maintenance tool.

In the OFF state, the amplifier 540 is not protected by the security system 500.

The security mode of the amplifier is determined by a security mode variable stored in the EEPROM 547, which can be modified by any of the methods described above for modifying configuration variables (e.g., using the configuration and maintenance tool from the ESP port or from a port of the base controller 530, or issuing an instruction to modify the variable from the remote control 510).

Turn-On Delay. Turn-on delay of the amplifier is the time between application of power to the amplifier and the amplifier being turned on. This delay is used to prevent multiple high-power consuming components from turning on simultaneously and causing the power supply voltage to dip excessively, or to spike. The turn on delay can also be used to turn on components so that they are in a known state. The turn-on delay for the amplifier 540 can be selected from several preprogrammed values, for example, 0.5, 1.0, 1.5, and 2.0 seconds, or the delay period can be set by the operator or installer. Delay period selection (and other configuration parameters, including those described below) is performed, for example, by issuing from the remote control 510 an instruction accompanied by an installer access code, or by connecting the configuration and maintenance tool to the ESP port of the amplifier 540, or to the base controller 530. The turn-on delay value is stored in the EEPROM 547.

Fan Mode. The amplifier 540 can be programmed for four operational modes of the fan 550: OFF, ON, Amp PWR, and Thermal Control. In the OFF and ON states, the fan is either on or off at all times, respectively. In the Amp PWR mode, the fan is on whenever the amplifier is turned on. In the Thermal Control mode, the processor 544 turns on the fan 550 when the temperature of the amplifier 540 exceeds a predetermined temperature limit. The temperature limit, which is stored in the EEPROM 547, can be selected from several preprogrammed values, or it can be set manually by the operator or installer from a continuous range of temperatures. The fan mode is determined by the value of a fan mode variable, also stored in the EEPROM 547.

Output Impedance. The processor 544 sets the output impedance of the amplifier 540 to 2 or 4 ohms, depending on the value of an output impedance variable stored in the EEPROM 547.

Load Protection Mode. In the default setting of the Load Protection mode, the amplifier 540 will not drive a 2 ohm load when it is set to output impedance of 4 ohms. The default setting can be overridden, however, by changing the value of a load protection mode variable, which is stored in the EEPROM 547. When the default protection mode is overridden, the amplifier will drive a 2 ohm load from a 4 ohm setting, either permanently or for a preprogrammed period, depending on the value of an override period variable, also stored in the EEPROM 547.

Display Mode. The display mode can be programmed to OFF, Fault Display, and Query Response states. In the OFF state, a subset of the display LEDs 551 is turned off. In the Fault Display mode, the processor 544 causes the display LEDs 551 to flash out codes corresponding to a predetermined number of immediately preceding "trips" of the amplifier 540. A "trip" means a set of conditions that caused the amplifier not to function. Examples of trip conditions include exceeding a thermal limit, power supply overvoltage, or excessively low load impedance. The amplifier 540 stores in the EEPROM 547 the trip events for subsequent diagnostics. In the Query Response state, the LEDs 551 flash out information responsive to queries sent by the base controller 530 over the bus 562. The information can include the trip events. As in the case of other programmable modes, the display mode setting is stored in the EEPROM 547.

Note that the trip events and other diagnostic and configuration data stored internally in the amplifier 540 can also be read through the configuration and maintenance tool pluggable into the ESP port of the amplifier 540, or into the base controller 530.

Input Signal Range Adjustment. Depending on the value of an input signal range variable (stored in the EEPROM 547), the audio processing section 543 is configured for different maximum levels of input signal. (The purpose of setting the maximum input signal level is to avoid overdriving the audio processing section 543, while using the full power available from the amplifier 540. When the input signal falls bellow the lower limit, dynamic range is lost and the amplifier output is less than the rated power; when the upper limit is exceeded, the amplifier is overdriven and its output is distorted.) In one implementation of the amplifier 540, the audio processing section 543 can be configured for four different maximum input voltage ranges: (1) 0.5–1.0 volts, (2) 1.0–2.0 volts, (3) 2.0–4.0 volts, and (4) 4.0–8.0 volts. In another implementation, the maximum input signal range is set by the operator or installer from a continuous range of values. The input signal range is stored in the EEPROM 547.

The amplifier 540 also provides the installer with the capability to prevent the operator from choosing an inappropriate input signal range. This is done by setting range adjustment lockout variables, which are stored in the EEPROM 547. The range adjustment lockout variables are set using the configuration and maintenance tool, or by issuing from the remote control 510 an appropriate instruction accompanied by an installer access code.

Gain Adjustment. The amplifier 540 includes a selector that allows the operator to adjust, within limits, the gain of the amplifier. Gain adjustment variables (stored in the EEPROM 547) determine the adjustment limits. Note that the upper and lower gain adjustment limits can both be set to the same value, locking out the manual adjustment capability. Gain adjustment variables are accessible using the configuration and maintenance tool, or by issuing from the remote control 510 an appropriate instruction accompanied by an installer access code.

Valet Mode Enable. If the Valet Mode is enabled, the security system 500 protects the amplifier 540 whenever the security system 540 is in the Valet Mode, in accordance with the Security Mode in effect at that time. If the Valet Mode is disabled, the amplifier 540 functions normally when the security system 500 is in the Valet Mode. The Valet Mode is enabled by writing an enable value into the valet mode enable variable stored in the EEPROM 547.

Display Supply Voltage Mode. The power supply 548 monitors the supply voltage received by the amplifier 540. A real time or averaged reading of the supply voltage can be output to the ESP port of the amplifier 540, or to the remote control 510 (via the bus 562 and the base controller 530), in accordance with the value of a display supply voltage variable stored in the EEPROM 547. This variable has three valid ranges: OFF, AUTO, and POLLED. In the OFF state, the amplifier 540 does not output the supply voltage reading. In the AUTO state, the supply voltage reading is output periodically. The period, also stored in the EEPROM 547, can be selected among several preprogrammed values, or it can be set manually by the operator or installer from a continuous range of allowed values. In the POLLED state, the amplifier 540 outputs the supply voltage reading in response to a polling command sent from the base controller 530. The polling command can be initiated by an instruction from the remote control 510.

Display Supply Current Mode. The power supply 548 also monitors the power supply current pulled by the amplifier 540. A real time or averaged reading of the current can be output to the ESP port, or to the remote control 510, in accordance with the value of a display supply current variable stored in the EEPROM 547. This variable has three valid ranges: OFF, AUTO, and POLLED. In the OFF state, the amplifier 540 does not output the supply current reading. In the AUTO state, the supply current reading is output periodically. The period, also stored in the EEPROM 547, can be selected from among several preprogrammed values, or it can be set manually by the operator or installer from a continuous range of allowed values. In the POLLED state, the amplifier 540 outputs the supply current reading in response to a polling command sent from the base controller 530, which can be initiated by an instruction from the remote control 510.

Display Output Wattage Mode. The amplifier 540 monitors the power of its audio output. An averaged reading of the audio power can be output to the ESP port, or to the remote control 510, in accordance with the value of a display output wattage variable stored in the EEPROM 547. This variable has three valid ranges: OFF, AUTO, and POLLED. In the OFF state, the amplifier 540 does not output the audio power reading. In the AUTO state, the output wattage reading is output periodically. The period, also stored in the EEPROM 547, can be selected from several preprogrammed values, or it can be set manually by the operator or installer from a continuous range of allowed values. In the POLLED state, the amplifier 540 outputs the audio power reading in response to a polling command sent from the base controller 530, which can be initiated by an instruction from the remote control 510.

Setting of Circuit Protection Limits. As has already been mentioned, the amplifier 540 monitors certain parameters, such as input voltage, load impedance, and temperature, and shuts itself down when these parameters violate circuit protection limits of the amplifier 540. The specific circuit protection limits can be written into the EEPROM 547 using any of the techniques already described. Because improper settings of the circuit protection limits can cause permanent damage to the amplifier 540, in some variants of the combination 50, modification of the circuit protection limits requires the use of the configuration and maintenance tool.

Setting of Audio Parameters. Some audio performance parameters of the audio processing section 543 are also configurable. These parameters include, for example, values of time alignment for different audio channels, enable/disable of surround sound, internal settings controlling equalization over multiple bands, enabling sonic effects of a large concert hall, definitions of artificial sitting positions, crossover frequencies, and many others. In operation, the processor 544 configures the audio parameters based on the audio configuration data stored in the EEPROM 547. This is done on power-up and after the audio parameters are modified in the EEPROM 547. To configure the audio processing section 543, the processor 544 reads the parameters from the EEPROM 547, and then writes appropriate data into the registers of the audio processing section 543, for example, into registers of the DSP processor of the section 543. The audio configuration parameters can be written into the EEPROM 547 by any of the methods already discussed, e.g., using the configuration and maintenance tool connected to the ESP port or to the port in the base controller 530, or by sending the parameters from the remote control 510.

Some functional features described above are absent from certain variants of the combination 50. And the above list of the functional features is far from exclusive. For example, some variants of the combination 50 provide for automatic or polled output by the amplifier 540 of its internal temperature, rail voltage, load impedance sensed, and a host of other parameters. As another example, the information provided to the ESP port or the remote control 510, such as supply voltage, supply current, and output wattage, can be flashed out in code by the LEDs 551, as was described above with reference to the trips of the amplifier 540.

Three ways to program configuration data and other parameters into the amplifier, and to receive data from the amplifier, have already been discussed. They are: (1) using the configuration and maintenance tool connected to the ESP port of the amplifier, (2) using the tool connected to the base controller, and (3) using the remote control to send instructions to the amplifier via the base controller. Another way to program the amplifier (or another installed equipment item) is described below with reference to FIG. 6, which illustrates a combination 60 of a car security system 600, an amplifier 640, and a rear-seat entertainment (RSE) system 680. Components of the combination 60 that are similar to components of the combination 50 of FIG. 5 are once again designated by similar numerals having "6" as the first digit.

The RSE 680 is installed in the same car as an amplifier 640 and a base controller 630 of a security system 600. The bus 662 now connects the base controller 630 not only with an amplifier processor 644, but also with an RSE processor 684, so that these three systems can communicate with each other. (The port coupling the processor 684 to the bus 662 and many other subcomponents of the RSE 680, such as its memories and power supply, are not shown in FIG. 6.) Thus, the security system 600 now protects both the amplifier 640 and the RSE system 680 from removal by arming these installed equipment items in a manner similar to what has already been described with reference to the security systems illustrated in FIGS. 1 and 5.

In addition to the entertainment components, such as a TV receiver and a DVD player, the RSE system 680 includes a video screen 681 and an input device 682. The input device 682 is a keypad similar to a TV remote control. In some variants of the combination 60, the keypad 682 is built into the RSE system 680. In other variants, the keypad 682 is in effect a second remote control, in addition to the remote control 610 of the security system 600. In yet other embodiments, the keypad 682 is integrated with the remote control 610, which can then be used to control the RSE system 680, as well as the security system 600 and the amplifier 640.

Using the screen 681 and the keypad 682, the operator or installer can gain access to menus with functions that transmit data and commands to and from the security system 600 and the amplifier 640. This is the fourth way for the operator or installer to configure and read data from the amplifier 640. To illustrate this method, FIG. 7 shows steps of a process 700 of issuing a command from the RSE 680 to the amplifier 640.

At step 702, the operator uses the keypad 682 to select a menu that contains the command to be issued. At step 704, the processor 684 receives the menu selection and, at step 706, causes the screen 681 to display the selected menu. The operator then uses the keypad 682 to select the command from the displayed menu, at step 708, and the processor 684 reads the selected command, at step 710. At step 712, the RSE processor 684 sends the selected command and a request to the base processor 632 using the bus 662. When the base processor 632 receives the command and the request, at step 714, it transmits an instruction that corresponds to the selected command to the amplifier processor 644, also using the bus 662. The last step is designated with numeral 716. At step 718, the amplifier processor 644 receives the instruction from the base processor 632. At step 720, the amplifier processor 644 performs the function corresponding to the selected command. In the method 700, the command is a diagnostic query. Thus, the amplifier processor 644 sends to the base processor 632 data responsive to the query, with a request to forward the data to the RSE processor 684. At step 722, the base processor 632 receives the data. At step 724, the base processor 632 sends the data to the RSE processor 684. Finally, the RSE processor 684 receives the data, at step 726, and causes the screen 681 to display the data, at step 728.

This document describes in some detail the inventive devices and methods for protecting, configuring, maintaining, and diagnosing installed equipment. This is done for illustration purposes only. Neither the specific embodiments of the invention as a whole, nor those of its features limit the general principles underlying the invention. In particular, the invention is not limited to audio amplifiers and RSE systems, but includes external crossovers, equalizers, power capacitors, navigational devices, airbags, and similar safety, convenience, entertainment, and security devices. The invention is also not limited to automotive uses. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is served by the claims and their equivalents.

We claim:

1. An installed equipment item for a vehicle, the item performing a function in the vehicle, the installed equipment item comprising:
    an installed equipment digital state machine controlling the function; and
    a bus interface capable of connecting the installed equipment digital state machine to a vehicle security system via a bus to provide information flow between the installed equipment digital state machine and the security system;
    wherein the installed equipment digital state machine prevents the installed equipment item from performing the function normally after receiving an arm command from the security system via the bus.

2. An installed equipment item in accordance with claim 1, wherein the installed equipment digital state machine causes the installed equipment item to perform the function normally after receiving a disarm command from the security system via the bus.

3. An installed equipment item in accordance with claim 2, further comprising an operational memory storing program code, wherein the installed equipment digital state machine comprises a processor executing the program code.

4. An installed equipment item in accordance with claim 3, wherein an interruption of power between successive arm and disarm commands causes the processor to prevent the item from performing the function normally until the item is connected to a configuration and maintenance tool and reset by the tool.

5. An installed equipment item in accordance with claim 3, wherein an interruption of power to the installed equipment item between successive arm and disarm commands causes the processor to prevent the item from performing the function normally until the item is reset by receiving an installer code via the bus, the installer code not being available to general public.

6. An installed equipment item in accordance with claim 3, further comprising a non-volatile memory storing configuration parameters of the installed equipment item, the configuration parameters affecting operation of the installed equipment item.

7. An installed equipment item in accordance with claim 6, wherein the program code causes the processor to store maintenance and diagnostic data of the installed equipment item in the non-volatile memory.

8. An installed equipment item in accordance with claim 7, wherein the program code causes the processor to send to the security system, via the bus, the maintenance and diagnostic data in response to commands requesting the maintenance and diagnostic data received from the security system via the bus.

9. An installed equipment item in accordance with claim 7, further comprising an ESP port capable of coupling the installed equipment item to a configuration and maintenance tool, wherein the program code causes the processor to send to the ESP port the maintenance and diagnostic data.

10. An installed equipment item in accordance with claim 7, further comprising an ESP port capable of coupling the installed equipment item to a configuration and maintenance tool, wherein the program code causes the processor to send to the ESP port the maintenance and diagnostic data in response to commands requesting the data received from the security system.

11. An installed equipment item in accordance with claim 7, further comprising an ESP port capable of coupling the installed equipment item to a configuration and maintenance tool, wherein the program code causes the processor to send to the ESP port the maintenance and diagnostic data in response to commands received through the ESP port.

12. An installed equipment item in accordance with claim 7, further comprising at least one light emitter coupled to the processor, wherein the program code causes the processor to flash codes corresponding to the maintenance and diagnostic data on the at least one light emitter.

13. An installed equipment item in accordance with claim 7, further comprising at least one light emitter coupled to the processor, wherein the program code causes the processor to flash codes corresponding to the maintenance and diagnostic data on the at least one light emitter in response to commands received from the security system.

14. An installed equipment item in accordance with claim 7, wherein:
    the security system comprises a remote control comprising a display and an input device for enabling a person to enter instructions, the instructions comprising at least one instruction to send a command requesting the installed equipment item to send data to the remote control;
    the security system transmits the command requesting the installed equipment item to send data to the installed equipment item in response to receiving the at least one instruction; and
    the processor sends the requested data to the security system in response to receiving the command requesting the installed equipment item to send data.

15. An installed equipment item in accordance with claim 14, wherein the installed equipment item further comprises an audio amplifier.

16. An installed equipment item in accordance with claim 15, wherein the requested data comprises trip event data of the audio amplifier.

17. An installed equipment item in accordance with claim 3, wherein:
    the security system comprises a remote control comprising a display and an input device for enabling a person to enter instructions, the instructions comprising at least one instruction to send the configuration parameters to the installed equipment item;

the security system transmits the configuration parameters to the processor of the installed equipment item in response to receiving the at least one instruction; and the processor of the installed equipment item receives the configuration parameters from the security system and configures the installed equipment item in accordance with the configuration parameters.

18. An installed equipment item in accordance with claim 17, wherein the installed equipment item further comprises an audio amplifier.

19. An installed equipment item in accordance with claim 18, wherein the configuration parameters received from the security system include turn-on delay of the audio amplifier.

20. An installed equipment item in accordance with claim 18, wherein:
the audio amplifier comprises a fan; and
the configuration parameters received from the security system include a mode of operation of the fan variable that determines the mode of operation of the fan.

21. An installed equipment item in accordance with claim 18, wherein the configuration parameters received from the security system include output impedance of the audio amplifier.

22. An installed equipment item in accordance with claim 18, wherein the configuration parameters received from the security system include a load protection mode variable that determines whether the audio amplifier will drive a load with impedance lower than output impedance of the audio amplifier.

23. An installed equipment item in accordance with claim 18, further comprising at least one light emitter coupled to the processor, wherein the configuration parameters received from the security system include a display mode variable, and the program code causes the processor to flash a code associated with a trip event of the audio amplifier if the display mode variable is set to a first value.

24. An installed equipment item in accordance with claim 18, wherein the configuration parameters received from the security system include an input signal range adjustment variable that sets maximum signal input power for the audio amplifier.

25. An installed equipment item in accordance with claim 18, further comprising a selector for manual adjustment of gain of the audio amplifier, wherein the configuration parameters received from the security system include a gain adjustment variable that determines gain adjustment range of the selector.

26. An installed equipment item in accordance with claim 7, further comprising a navigation system performing the function.

27. An installed equipment item in accordance with claim 7, further comprising a stereo system performing the function.

28. An installed equipment item in accordance with claim 7, further comprising a rear-seat entertainment system performing the function.

29. An installed equipment item in accordance with claim 7, further comprising an audio amplifier performing the function.

30. An installed equipment item for a vehicle, the item performing a function in the vehicle, the installed equipment item comprising:
an operational memory storing program code;
a processor executing the program code; and
a bus interface capable of connecting the processor to a vehicle security system via a bus to provide information flow between the processor and the security system;
wherein the processor, in response to a query command received from the security system via the bus, sends to the security system, via the bus, data relating to operation of the installed equipment item.

31. An installed equipment item according to claim 30, wherein the processor receives configuration parameters for the installed equipment item from the security system via the bus and configures the installed equipment item in accordance with the received configuration parameters.

32. An installed equipment item according to claim 31, wherein the data relating to operation of the installed equipment item comprises maintenance and diagnostic data.

33. An installed equipment item according to claim 31, further comprising a non-volatile memory storing the received configuration parameters.

34. An installed equipment item in accordance with claim 31, further comprising an audio amplifier.

35. An installed equipment item in accordance with claim 34, wherein the requested data comprises trip event data of the audio amplifier.

36. An installed equipment item according to claim 30, further comprising a non-volatile memory storing the data relating to operation of the installed equipment item.

37. An installed equipment item in accordance with claim 36, wherein the installed equipment item further comprises an audio amplifier.

38. An installed equipment item in accordance with claim 37, wherein the requested data comprises trip event data of the audio amplifier.

39. An installed equipment item for a vehicle, the item performing a function in the vehicle, the installed equipment item comprising:
an operational memory storing program code;
a processor executing the program code; and
a bus interface capable of connecting the processor to a vehicle security system via a bus to provide information flow between the processor and the security system;
wherein the processor receives configuration parameters for the installed equipment item from the security system via the bus and configures the installed equipment item in accordance with the received configuration parameters.

40. An installed equipment item according to claim 39, further comprising a non-volatile memory storing the received configuration parameters.

41. An installed equipment item in accordance with claim 39, further comprising an audio amplifier, wherein the function comprises audio amplification.

42. An installed equipment item in accordance with claim 41, wherein the configuration parameters comprise audio performance parameters of the audio amplifier.

43. A vehicular system, comprising:
a security system base controller installed in a vehicle;
a security system base transceiver installed in the vehicle and coupled to the base controller;
a bus;
a security system remote control comprising a human input device, a display device, and a remote control transceiver communicating with the base transceiver, the remote control being capable of sending instructions and data inputted through the human input device to the base controller via the base and remote control transceivers, the remote control being coupled to the bus; and an installed equipment item for performing a function, the installed equipment item being installed in the vehicle and coupled to the base controller via the bus, the installed equipment item comprising an operational memory storing program code, an installed equipment processor executing the code, and an interface port coupling the installed equipment processor to the bus;

wherein the installed equipment processor prevents the installed equipment item from performing the function normally after receiving an arm command from the base controller via the bus.

44. A system according to claim 43, wherein the installed equipment processor causes the installed equipment item to perform the function normally after receiving a disarm command from the base controller via the bus.

45. A system according to claim 44, wherein an interruption of power to the installed equipment item between successive arm and disarm commands prevents the item from performing the function normally until the item is connected to a configuration and maintenance tool.

46. A system in accordance with claim 44, wherein an interruption of power to the installed equipment item between successive arm and disarm commands prevents the item from performing the function normally until the item is reset by receiving an installer code from the base controller via the bus, the installer code not being available to general public.

47. A system in accordance with claim 44, wherein the installed equipment item further comprises a non-volatile memory for storing configuration parameters of the installed equipment item, the configuration parameters affecting operation of the installed equipment item.

48. A system in accordance with claim 47, wherein:
the base controller receives the configuration parameters from the remote control and transmits the configuration parameters to the installed equipment processor via the bus; and
the installed equipment processor receives the configuration parameters from the base controller, stores the configuration parameters in the non-volatile memory, and configures the installed equipment item in accordance with the configuration parameters.

49. A system in accordance with claim 44, further comprising a non-volatile memory, wherein the program code causes the installed equipment processor to store maintenance and diagnostic data of the installed equipment item in the non-volatile memory.

50. A system in accordance with claim 44, wherein:
the base controller is capable of receiving from the remote control an instruction entered by an operator through the human input device, the instruction requesting maintenance and diagnostic data from the installed equipment item;
the base controller is capable of sending, in response to the instruction, a command to the installed equipment item to provide the maintenance and diagnostic data;
the program code causes the installed equipment processor to send to the base controller the maintenance and diagnostic data in response to the command;
the base controller is capable of receiving the maintenance and diagnostic data from the installed equipment item and sending the received maintenance and diagnostic data to the remote control; and the remote control is capable of receiving the maintenance and diagnostic data sent by the base controller and displaying the data on the display device.

51. A system in accordance with claim 50, wherein the installed equipment item comprises an audio amplifier, and the maintenance and diagnostic data comprises trip event data of the audio amplifier.

52. A vehicular system, comprising:
a bus;
a security system base controller installed in a vehicle and coupled to the bus;
a security system base transceiver installed in the vehicle and coupled to the base controller;
a security system remote control comprising a human input device, a display device, and a remote control transceiver communicating with the base transceiver, the remote control being capable of sending instructions and data inputted through the first human input device to the base controller; and
an installed equipment item for performing a function, the installed equipment item being installed in the vehicle and coupled to the base controller via the bus, the installed equipment item comprising an operational memory storing program code, an installed equipment processor executing the code, and an interface port coupling the installed equipment processor to the bus, the installed equipment processor configuring the installed equipment item for performing the function based on values of configuration parameters;
wherein the remote control is capable of receiving the configuration parameters through the human input device and sending the configuration parameters to the base controller, and the base controller is capable of receiving the configuration parameters from the remote control and sending the configuration parameters to the installed equipment item processor via the bus.

53. A system in accordance with claim 52, wherein the installed equipment item further comprises an audio amplifier, the function comprises audio amplification, and the configuration parameters comprise audio performance parameters of the audio amplifier.

54. A vehicular system, comprising:
a security system base controller installed in a vehicle;
a bus;
an entertainment system installed in the vehicle, the entertainment system comprising a human input device, a display device, and a port coupling the entertainment system to the bus, the entertainment system being capable of sending instructions and data inputted through the human input device to the base controller; and
an installed equipment item for performing a function, the installed equipment item being installed in the vehicle and coupled to the base controller via the bus, the installed equipment item comprising an operational memory storing program code, an installed equipment processor executing the code, and an interface port coupling the installed equipment processor to the bus;
wherein the entertainment system is capable of receiving the configuration parameters through the human input device and sending the configuration parameters to the base controller, the base controller is capable of receiving the configuration parameters from the entertainment system and sending the configuration parameters to the installed equipment item processor via the bus, and the installed equipment processor uses the configuration parameters received from the base controller to configure the installed equipment item.

55. A system in accordance with claim 54, wherein the installed equipment item further comprises an audio amplifier, the function comprises audio amplification, and the configuration parameters comprise audio performance parameters of the audio amplifier.

56. A vehicular system, comprising:
a security system base controller installed in a vehicle;
a bus coupled to the base controller;
an entertainment system comprising a human input device and an interface port coupling the entertainment system to the bus, the entertainment system being installed in the vehicle; and
an installed equipment item for performing a function, the installed equipment item being installed in the vehicle and coupled to the bus, the installed equipment item comprising an operational memory storing program code, an installed equipment processor executing the code, and an interface port coupling the installed equipment processor to the bus, the installed equipment processor configuring the installed equipment item based on values of configuration parameters;
wherein the entertainment system is capable of receiving the configuration parameters through the human input device and sending the configuration parameters to the installed equipment item processor via the bus.

57. A vehicular system, comprising:
a security system base controller installed in a vehicle;
a bus coupled to the base controller;
an entertainment system comprising a human input device and a display device, the entertainment system being installed in the vehicle and coupled to the bus; and
an installed equipment item for performing a function, the installed equipment item being installed in the vehicle and coupled to the bus, the installed equipment item comprising an operational memory storing program code, an installed equipment processor executing the code, and an interface port coupling the installed equipment processor to the bus, the installed equipment processor being capable of sending maintenance and diagnostic data relating to operation of the installed equipment item via the bus;
wherein the entertainment system is capable of sending a request for the maintenance and diagnostic data relating to operation of the installed equipment via the bus.

58. A vehicular system in accordance with claim 57, wherein the entertainment system sends the request to the base controller via the bus, the base controller sends the request to the installed equipment processor via the bus, the installed equipment processor sends, in response to the request, the maintenance and diagnostic data relating to operation of the installed equipment to the base controller via the bus, the base controller receives the data from the installed equipment processor and sends the data to the entertainment system via the bus, and the entertainment system receives the data and displays the data on the display device.

59. A vehicular system in accordance with claim 57, wherein the entertainment system sends the request to the installed equipment processor via the bus, the installed equipment processor sends, in response to the request, the maintenance and diagnostic data relating to the entertainment system via the bus, and the entertainment system receives the data and displays the data on the display device.

60. A process for securing an installed equipment item in a vehicle protected by a security system, the process comprising the steps of:
sending arm signals from the security system to the installed equipment item when the security system is armed to protect the vehicle;
sending disarm signals from the security system to the installed equipment item when the security system is disarmed to allow operation of the vehicle;
reducing functionality of the installed equipment item in response to the arm signals so as to prevent normal functionality;
returning functionality of the installed equipment item to normal in response to receiving the disarm signals; and
requiring a reset of the installed equipment item prior to returning the installed equipment item to normal functionality if power to the installed equipment item is interrupted after an arm signal not followed by a disarm signal.

61. A process for configuring an installed equipment item in a vehicle protected by a security system comprising a base controller installed in the vehicle and a remote control capable of communicating with the base controller, the process comprising the steps of:
receiving installed equipment item configuration data at the remote control;
sending the configuration data from the remote control to the base controller;
receiving the configuration data at the base controller;
sending the configuration data from the base controller to the installed equipment item;
receiving the configuration data at the installed equipment item; and
configuring the installed equipment item in accordance with the configuration data.

62. A process of obtaining maintenance and diagnostic data from an equipment item installed in a vehicle protected by a security system, the security system comprising a base controller installed in the vehicle and a remote control capable of communicating with the base controller, the process comprising the steps of:
sending from the remote control to the base controller an instruction to request the data from the installed equipment item;
receiving the instruction at the base controller;
sending, in response to the instruction, a command from the base controller to the installed equipment item requesting the data;
receiving the command at the installed equipment item;
sending, in response to the command, the data from the installed equipment item to the base controller;
receiving the data at the base controller;
sending the data from the base controller to the remote control;
receiving the data at the remote control; and
displaying the data at the remote control.

63. A process of obtaining maintenance and diagnostic data from an equipment item installed in a vehicle protected by a security system, the security system being coupled to the equipment item and to an entertainment system installed in the vehicle, the entertainment system comprising a display, the process comprising the steps of:
sending from the entertainment system to the security system an instruction to request the data from the installed equipment item;
receiving the instruction at the security system;

sending, in response to the instruction, a command from the security system to the installed equipment item requesting the data;

receiving the command at the installed equipment item;

sending, in response to the command, the data from the installed equipment item to the security system;

receiving the data at the security system;

sending the data from the security system to the entertainment system;

receiving the data at the entertainment system; and displaying the data on the display of the entertainment system.

64. A process for configuring an installed equipment item in a vehicle protected by a security system coupled to the installed equipment item and to an entertainment system installed in the vehicle, the entertainment system comprising a human input device, the process comprising the steps of:

providing installed equipment item configuration data to the entertainment system through the human input device;

sending the configuration data from the entertainment system to the security system;

receiving the configuration data at the security system;

sending the configuration data from the security system to the installed equipment item;

receiving the configuration data at the installed equipment item; and configuring the installed equipment item in accordance with the configuration data.

* * * * *